Aug. 26, 1958  R. M. HUBBARD  2,849,673
TRANSISTORIZED INVERTERS
Filed Oct. 8, 1956

INVENTOR.
ROBERT M. HUBBARD
BY
Reynolds, Beach & Christensen
ATTORNEYS

United States Patent Office 2,849,673
Patented Aug. 26, 1958

2,849,673

TRANSISTORIZED INVERTERS

Robert M. Hubbard, Seattle, Wash., assignor to Boeing Airplane Company, Seattle, Wash., a corporation of Delaware Application October 8, 1956, Serial No. 614,397

8 Claims. (Cl. 321—44)

This invention relates to improvements in inverters of a type using transistors and transformers with "square" hysteresis loop cores for converting direct voltage into square-wave alternating voltage. A general object thereof is to provide an inverter of that type adapted for the regulation or adjustment of inverter frequency independently of output voltage or load. The invention is herein illustratively described by reference to its presently preferred form; however, it will be recognized that certain modifications and changes therein with respect to details may be made without departing from the essential features involved.

The use of junction transistors as controlled switches in conjunction with square hysteresis loop core transformers for producing square-wave alternating voltage in a multi-vibrator type circuit arrangement has been proposed heretofore. In the former circuit, the various timing and output windings were comprised in a single transformer, and since operating frequency depends on the magnitude of applied direct voltage, any attempt to regulate applied voltage and thereby operating frequency required that the regulator have the capacity to handle output power as well as frequency control power. That required a complex regulator of relatively large capacity. Moreover, the interdependence of frequency control voltage and output voltage resulting from the use of a common transformer core for the timing and output windings precluded the independent adjustment or regulation of operating frequency and output voltage. Also the transformer core design was necessarily based on a compromise between the inconsistent requirements for optimum timing control characteristics and optimum power transfer charactistics of the transformer.

In general the present invention provides a transistorized inverter which overcomes the above mentioned limitations of the former circuit while retaining the important advantages thereof. This is brief it accomplishes by the complete separation of the timing control function from the power delivery function of the circuit, using separate transformers for the performance of these two functions. Thus, the power delivery or output transformer may be made of optimum power transformer design, whereas the timing control transformer may be made of optimum design for its purpose using the principle of a square hysteresis loop core for controlling the switching action of the transistors. Separate direct voltage sources for the timing and power delivery functions may be used if desired to the end that independent regulation and/or adjustment of inverter frequency and output voltage may be achieved. Also, improved frequency stability under changing load conditions is realized because of the independence of the load and timing portions of the circuit. These and other features and advantages of the novel circuit arrangement will appear as the description proceeds on the basis of the accompanying drawings.

Figure 1:
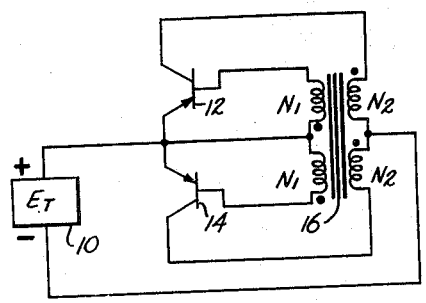
Figure 1 is a schematic diagram of the timing portion of the improved circuit.
Figure 2:
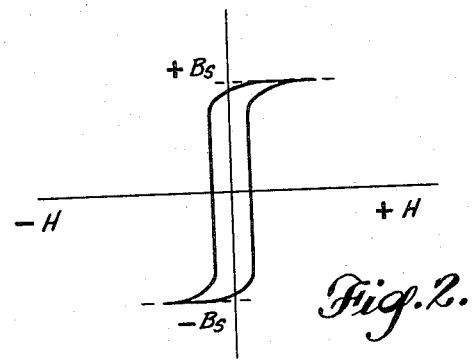
Figure 2 is a somewhat idealized graph of the timing transformer core characteristic showing what is meant by a "square" hysteresis loop.

Referring to Figures 1 and 2, the timing portion of the circuit shown in the former figure comprises a source 10 of direct voltage $E_T$ having the polarity indicated, junction transistors 12 and 14 having emitter, collector and base electrodes, and transformer 16 having a "square" hysteresis loop core, a pair of similar secondaries ($N_1$) of $N_1$ turns each, and a pair of similar primaries ($N_2$) of $N_2$ turns each. The secondaries $N_1$ are respectively series connected with the emitter-base electrodes of the respective transistors, with the transistor emitters being connected to the positive terminal of source 10 and to the mutually adjacent but oppositely poled ends of secondaries $N_1$. The primaries $N_2$ are respectively series connected with the respective transistor collectors, and their remaining, mutually adjacent but oppositely poled ends are connected to the negative terminal of source 10.

When voltage $E_T$ is applied, one transistor will conduct more emitter-collector current than the other due to inevitable slight differences in electrical characteristics of the transistors. The difference between the resulting currents flowing in the respective windings $N_2$ will therefore produce a flux change in the core of transformer 16. The establishment of this flux change will induce feedback voltages in the secondary windings $N_1$, which will be applied as base drive voltages to the transistors. The feedback voltages are of such a polarity as to increase the collector current in the more conductive transistor while decreasing the collector current in the less condutive transistor. This produces a further difference in current flow in the primary windings $N_2$ and a further increase in core flux change. The net result is that one transistor is progressively driven to collector current saturation while the other is driven at the same rate to collector current cutoff. During the progressive change, the core flux of the transformer will continue to increase in the direction indicated until the knee or break in the "square" hysteresis loop of the core is reached (Figure 2). At that instant, when core flux density has arrived at the point of substantial saturation of the core, the feedback voltage is greatly reduced because the rate of change of flux has suddenly dropped. As a result, the transistor base drive becomes insufficient to maintain the conductive transistor in its high level of saturation, and some reduction in conductivity thereof takes place. The resulting reduction of core flux in the transformer causes a reversal in polarity of the induced voltages in secondaries $N_1$. With reversed base drive, the saturated transistor is driven progressively towards cutoff and the cutoff transistor towards saturation. The flux density in the transformer core is now progressively changed from one saturation level toward the opposite level, following the hysteresis loop indicated in Figure 2. When the opposite level of saturation is reached the cycle repeats itself.

It may be shown that the switching frequency in such a circuit is substantially:

$$f = \frac{E_T}{4AN_2B_S}$$

where A is the core cross-section of the transformer and $B_S$ is the flux density per unit of cross-sectional area of the core at the effective value of core saturation. It is therefore evident that frequency of operation of the circuit is proportional to applied timing voltage $E_T$.

Figure 3:
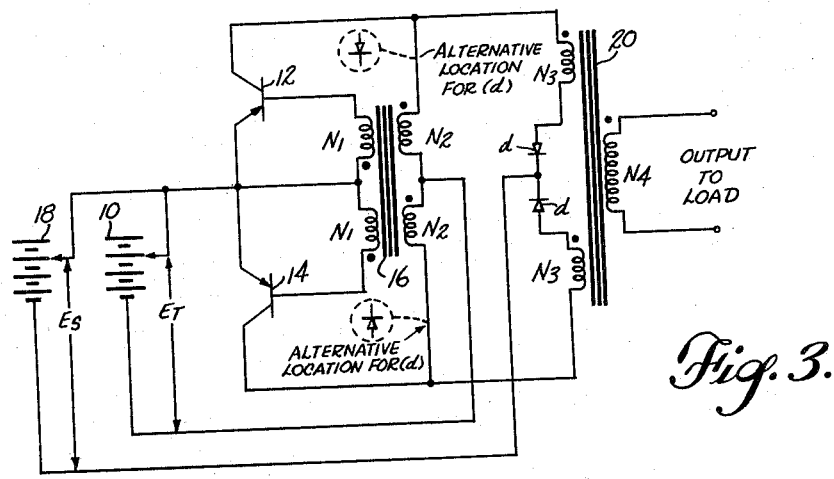
Figure 3 is a schematic diagram of the complete circuit in its presently preferred form.

In effect the transistors 12 and 14 function as voltage controlled switches or relays as a result of the action of the square hysteresis loop core transformer and the feedback connections to the transistors. The alternate conductivity and cutoff of the respective transistor load electrodes (emitter and collector in the example) is utilized in the complete circuit shown in Figure 3 to apply direct voltage $E_S$ from the direct voltage source 18 to the respective oppositely poled primaries $N_3$ of power transformer 20 in alternate sequence. For this purpose the mutually adjacent but oppositely poled ends of the primaries $N_3$ are connected together through respective diodes $d$ having the polarities shown in the figure to the negative side of direct voltage source 18, whereas the opposite ends of these primaries are connected respectively to the collectors of the transistors 12 and 14. The power transformer secondary $N_4$ may be arranged to be connected to any suitable load (not shown). In the arrangement of Figure 3, separate direct voltage sources 10 and 18 are used for the timing portion of the circuit and power delivery portion of the circuit respectively. In this novel circuit arrangement, wherein a separate power output transformer 20 and timing control transformer 16 are used, independent adjustment of frequency may be effected by varying the timing voltage $E_T$ without affecting the output voltage of the circuit, and separate adjustment of output voltage may be made by varying the voltage $E_S$ without affecting the circuit frequency. If desired, the source 10 may comprise a voltage regulated source, in which event the regulating means thereof (not shown) need carry only the power required to perform the timing control function whereas any suitable regulator or none at all may be provided separately in the source 18.

The function of the two diodes $d$ is one of decoupling the respective power output transformer primaries $N_3$ from the timing transformer primaries $N_2$ to prevent induced voltages in the power transformer primaries from producing currents in the timing transformer primaries, without preventing normal operating current flow in any of the primaries. This insures independence of the timing and power transfer functions. In the illustrated positions of the diodes $d$ they are effective to accomplish this result if the sum of $E_S$ and the voltage induced in a power transformer primary $N_3$ is less than the sum of $E_T$ and the voltage induced in the associated timing transformer primary $N_2$. If the reverse is true, these diodes must be placed in their alternative locations in the direct leads for the timing control transformer primaries $N_2$, as indicated in the figure. The need to consider alternative positions for the decoupling diodes arises from the use of separate direct voltage sources 10 and 18 for the two portions of the circuit.

Figure 4:
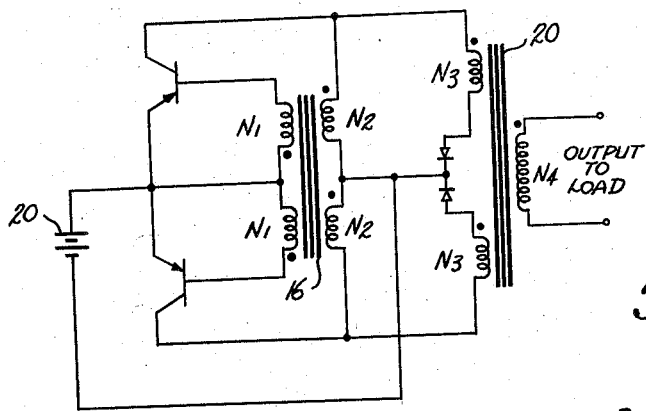
Figure 4 is a schematic diagram of a modified circuit arrangement using a single direct voltage source while retaining separation of the timing and power delivery portions of the circuit.

In the modification shown in Figure 4 a single direct voltage source 20 serves both the timing portion and the power transfer portion of the circuit. In this case the decoupling diodes are located at the places indicated, namely in the direct leads for the power output transformer primaries $N_3$. While the simplified circuit arrangement shown in Figure 4 does not possess all of the advantages of that shown in Figure 3 it does have the advantage common to both arrangements, that the timing control transformer 16 may be of optimum design for its intended function whereas the power transformer 20 may be of optimum design for its intended function, each without interfering with the function of the other. This results in achieving improved frequency stability of the circuit over the former arrangement in which a single transformer having a multiplicity of windings performed both functions. The source 20 may or may not be a voltage regulated source.

It will of course be evident that the shape of the output wave of alternating voltage delivered by the improved circuit in either of its illustrated forms may be modified by the connection of suitable filtering or wave-shaping networks to the power transformer secondary $N_4$, although the circuit as shown is essentially a square-wave generator.

The circuit is readily designed to achieve stability of operation due to the fact that the transistors as switches are the only elements common to both the timing circuit and the output circuit through which intercoupling may occur, and these may be selected to have a very low resistance in their collector current saturation condition and a very high resistance to collector current flow at cutoff. Independence between the timing and power transfer portions of the circuit is enhanced when the circuit is designed to develop timing voltages which are large in relation to the saturation load drop in the transistor collector-emitter paths. For example, in one typical case using a commercially available fused-junction power transistor it was found possible, with a 28 volt timing supply $E_T$ and 0.2 volts drop between collector and emitter at 1 ampere collector current to permit the load to vary from zero to full load with less than 1% change of frequency.

Also the output voltage regulation is dependent on the closed-circuit impedance of the transistor as a switch. With the same set of conditions as those mentioned in the preceding paragraph it was found readily possible to permit the load to vary throughout its full range with less than 1% change of output voltage.

Another practical design consideration resides in the selection of the core material for the timing control transformer 16. This core material may be "Hypernik-V." The 80% nickel-iron materials, such as "Hymu" are also suitable. Still others may also be used. In general, the timing transformer should be designed in accordance with good transformer design practice, keeping in mind the non-linear nature of the load on the feedback windings $N_1$. If the exciting current is small compared to the full load current and the regulation is reasonably good (i. e., relatively low IR drop due to exciting and switching currents flowing in the windings $N_2$), the "squareness" of the core hysteresis loop becomes of less importance. In fact, appreciable slope of the upper or saturation portions of the hysteresis loop may be desirable (i. e., less than maximum attainable "squareness ratio") in order to avoid difficulty in starting oscillations in the circuit under load if the initial flux level in the core happens to be near the residual flux level when voltage is first applied to the timing portion of the circuit.

These and other aspects of the invention will become evident to those skilled in the art.

I claim as my invention:

1. A circuit for converting direct voltage into alternating voltage, comprising two transistors each having emitter, collector and base, a timing control transformer having a core of the type represented by a "square" hysteresis loop, a pair of similar primaries and a pair of similar secondaries, a source of direct voltage having a positive terminal connected to the emitters of both transistors, means connecting said secondaries respectively in series with the emitter and base of said transistors respectively with relatively opposite polarity of said secondaries in relation thereto, said direct voltage source having a negative terminal connected to one end of one primary and to the oppositely poled end of the other primary, means connecting the remaining ends of said primaries to the transistor collectors, respectively, thereby to form a self-oscillating circuit wherein said transistors are alternately driven between collector current saturation and cutoff by feedback through said timing control transformer, a power output transformer having a pair of primaries and a secondary, means including a source of direct voltage connecting the collector and emitter of one transistor in series with one such output transformer primary to pass direct current through the latter during periods of transistor conductivity between such collector and emitter, and means including a source of direct voltage connecting the collector and emitter of the other transistor in series with the other such output transformer primary to pass direct current through the latter with a polarity opposite to that of the first such primary during periods of transistor conductivity between such latter collector and emitter, thereby to induce alternating voltage in such output transformer secondary during self-oscillation of said self-oscillating circuit.

2. The circuit defined in claim 1, wherein all of the named sources of direct voltage comprise a single source of direct voltage.

3. The circuit defined in claim 2, and unidirectionally conductive elements respectively interposed directly in series with each of the respective output transformer primaries with a polarity permitting said flow of direct current therethrough while blocking reverse flow of direct current therethrough, thereby to isolate the windings of the timing control transformer from induced voltages in the primaries of the power output transformer.

4. The circuit defined in claim 1, wherein the last two mentioned sources of direct voltage comprise a single source of direct voltage separate from the first mentioned source of direct voltage.

5. The circuit defined in claim 4, wherein the two separate voltage sources in series with one of the timing control transformer primaries and the corresponding power output transformer primary form one potential interaction circuit, and the two separate voltage sources in series with the other such primaries form a second potential interaction circuit, and unidirectionally conductive means interposed in each such potential interaction circuit at a location therein preventing induced voltage in either such power output transformer primary from passing current through the associated timing control transformer primary while permitting normal flow of current through such power output transformer and timing control transformer primaries attending operation of the circuit.

6. A transistorized inverter comprising two transistors each having emitter, base and collector electrodes, one pair of such electrodes comprising control electrodes and a second pair of such electrodes comprising load electrodes, a first direct voltage source, a timing transformer having a pair of primaries, a pair of secondaries and a core common thereto of the type presenting a "square" hysteresis loop, means connecting each of said primaries in series with said source and the load electrodes of one of the respective transistors to pass current through said primaries with relatively opposite polarity during conductivity of the respective transistors between their load electrodes, means connecting the control electrodes of each transistor in series with one of the respective secondaries with relatively opposite polarity of said secondaries in relation thereto, thereby to form a self-oscillating circuit including said first power source, said transistors and said timing transformer, a second direct voltage source, a power output transformer separate from said timing transformer and having a secondary and a pair of primaries, means connecting said second direct voltage source in series with the load electrodes of one transistor and one of said output transformer primaries, means connecting said second direct voltage source in series with the load electrodes of the other transistor and the other of said power output transformer primaries, with relatively opposite polarity of said power output transformer primaries, thereby to induce alternating current in said power output transformer secondary accompanying self-oscillation of said self-oscillation circuit, and unidirectionally conductive means in circuit with said timing and power output transformer primaries preventing induced voltages in said power output transformer primaries from passing current through said timing transformer primaries without preventing normal current flow through any of said primaries.

7. The combination defined in claim 6, wherein one of the direct voltage sources is variable independently of the other.

8. The combination defined in claim 6, wherein the first and second direct voltage sources comprise a single source.

References Cited in the file of this patent

UNITED STATES PATENTS

| | | |
|---|---|---|
| 2,748,274 | Pearlman | May 29, 1956 |
| 2,757,243 | Thomas | July 31, 1956 |
| 2,791,739 | Light | May 7, 1957 |